March 22, 1966 L. HALL 3,241,281
MOTOR VEHICLE WINDOW MOUNTING
Filed April 9, 1964 2 Sheets-Sheet 1

LESLIE HALL
Inventor

By John L. Faulkner
John J. Roethel
Attorneys

March 22, 1966  L. HALL  3,241,281
MOTOR VEHICLE WINDOW MOUNTING

Filed April 9, 1964  2 Sheets-Sheet 2

LESLIE HALL
Inventor

By John R. Faulkner
John J. Roethel
Attorneys

United States Patent Office 3,241,281
Patented Mar. 22, 1966

3,241,281
MOTOR VEHICLE WINDOW MOUNTING
Leslie Hall, Northfield, Birmingham, England, assignor to Ford Motor Company, Dearborn, Mich., a corporation of Delaware
Filed Apr. 9, 1964, Ser. No. 358,532
Claims priority, application Great Britain, Apr. 24, 1963, 16,229/63
2 Claims. (Cl. 52—400)

This invention relates to motor vehicle windows.

Motor vehicle windows are normally held in their frames by extruded or molded rubber weatherstrips which are also used to hold decorative metallic or non-metallic moldings in position. Recently, however, the windows in some vehicles have been bonded in their frames and rubber weatherstrips have not been used. In the latter kind of windows there is difficulty in securing the decorative moldings around the edges of the window. This invention is concerned with securing such moldings around the window.

In a motor vehicle window according to the present invention the glass is bonded to the window frame; a decorative holding has a lip and a pair of flanges; the lip engages the surface of the glass, or of a channel in which the glass is held, adjacent the frame to prevent movement of the molding away from the frame; one flange of the molding engages a first shoulder on the frame to prevent movement of the glass in its own plane; and the second flange engages a second shoulder on the frame to prevent movement of the glass perpendicular to its plane towards the frame.

The molding is thus not only held in position but also serves to locate the glass in position in its frame during setting or curing of the adhesive, which is conveniently a polysulphide rubber adhesive.

The lip and flanges may be interrupted, and in this case spacers rigid with the window frame may fit between interruptions of at least one flange.

The invention is hereinafter particularly described with reference to the accompanying drawings in which.

Figure 1:
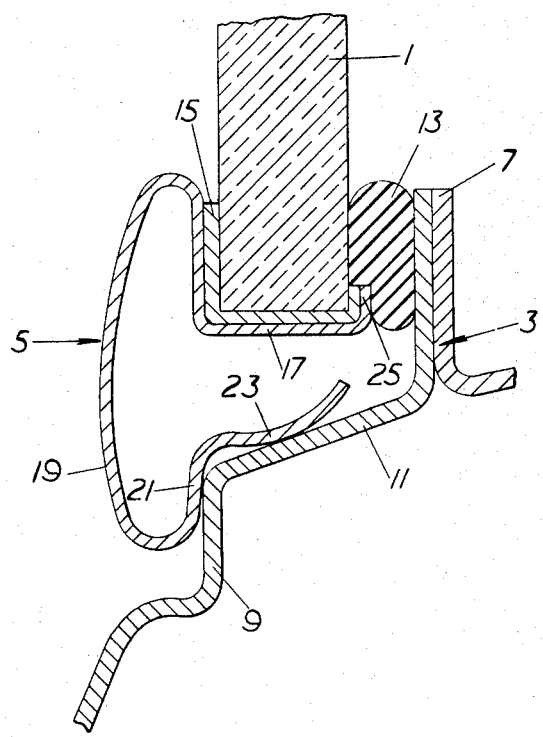
FIG. 1 is a section through the edge portion of one window.

The window (FIG. 1) comprises a glass 1, a frame 3, and a resilient metallic decorative molding 5. The frame 3 has a pinch weld flange 7 which defines the actual window aperture, and a pair of inclined locating shoulders 9 and 11. The glass 1 is bonded to the flange 7 by polysulphide rubber 13. A channel 15 of anti-squeak material fits around the edge of the glass. The decorative molding 5 has a channel shaped section 17 which engages the channel 15, a convex decorative surface 19, a flange 21 which engages the locating shoulder 9 and a flange 23 which engages the locating shoulder 11. The channel shaped section 17, and the flanges 21 and 23 are continuous.

The lip 25 of the section 17 engages the surface of the channel 15 adjacent the frame 3 to prevent movement of the molding away from the frame; the flange 21 engages the locating shoulder 9 to prevent movement of the glass perpendicular to its plane towards the frame; and the flange 23 engages the locating shoulder 11 to prevent movement of the glass in its own plane. Thus the decorative molding is shaped so as to prevent movement of the glass towards the frame or in its own plane towards the edges of the frame, and may consequently advantageously be used during curing of the adhesive to locate the glass. The lip 25, after the glass has been bonded to the frame, holds the decorative molding in position.

Figure 2:
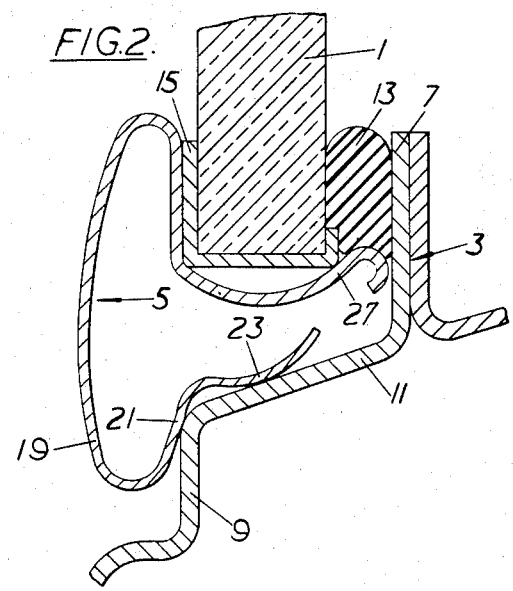
FIG. 2 is a section through the edge portion of another window.

The window shown in FIG. 2 is substantially the same as that shown in FIG. 1. The only difference is that the molding does not have a channel shaped section 17; instead it has a lip 27 which engages the inner corner of the channel 15 to prevent movement of the molding away from the frame.

Figure 3:
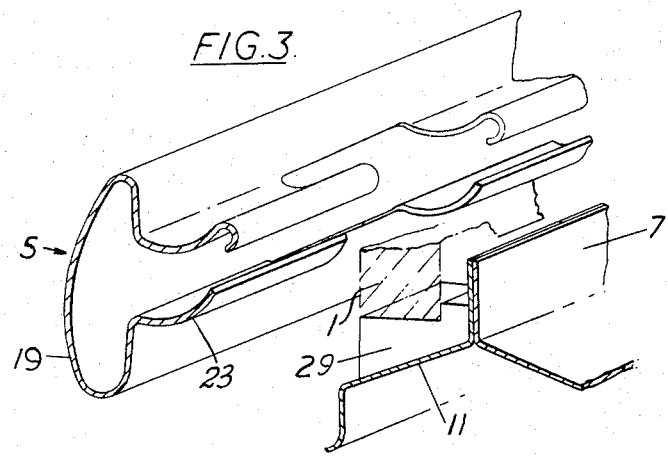
FIG. 3 is an exploded perspective view of the edge portion of yet another window.

The decorative molding 5 in FIG. 2, as did the decorative molding shown in FIG. 1, has a continuous lip 27 and continuous flanges 21 and 23. The lip 27 and the flanges 21 and 23, however, may be interrupted as shown in FIG. 3. In the window shown in FIG. 3, spacers 29 are rigid with the shoulder 11, and may be constituted by nylon members bonded to the shoulder 11 or by formations pressed out of the shoulder 11. The spacers 29 fit between the interruptions in the flanges 21 and 23.

It will be understood that the invention is not to be limited to the exact construction shown and described, but that various changes and modifications may be made without departing from the spirit and scope of the invention, as defined in the appended claims.

I claim:

1. In a motor vehicle window assembly in which the glass is bonded to the window frame; a decorative molding having a lip and a pair of flanges; said lip engaging the surface of the glass adjacent the frame to prevent movement of the molding from the frame; one flange of the molding engaging a first shoulder on the frame to prevent movement of the glass in its own plane; the second flange engaging a second shoulder on the frame to prevent movement of the glass perpendicular to its plane towards the frame; said lip and at least one of said flanges on the molding being interrupted; and spacers rigid with the window frame fitting between the interruptions of said one flange.

2. A window assembly according to claim 1 in which a channel of anti-squeak material partially encompassing the edge of the said glass is interposed between the decorative molding lip and said glass.

References Cited by the Examiner
UNITED STATES PATENTS

| | | | |
|---|---|---|---|
| 2,039,836 | 5/1936 | Potter | 296—84 |
| 2,437,664 | 3/1948 | Hicks | 296—84 |
| 2,497,261 | 2/1950 | Hicks. | |
| 3,155,204 | 11/1964 | Campbell | 189—77 |

FOREIGN PATENTS 678,819  9/1952  Great Britain.

HARRISON R. MOSELEY, *Primary Examiner.*